Aug. 26, 1930.  L. C. HESTER  1,774,008
AGRICULTURAL MACHINE
Filed Nov. 3, 1927   5 Sheets-Sheet 1
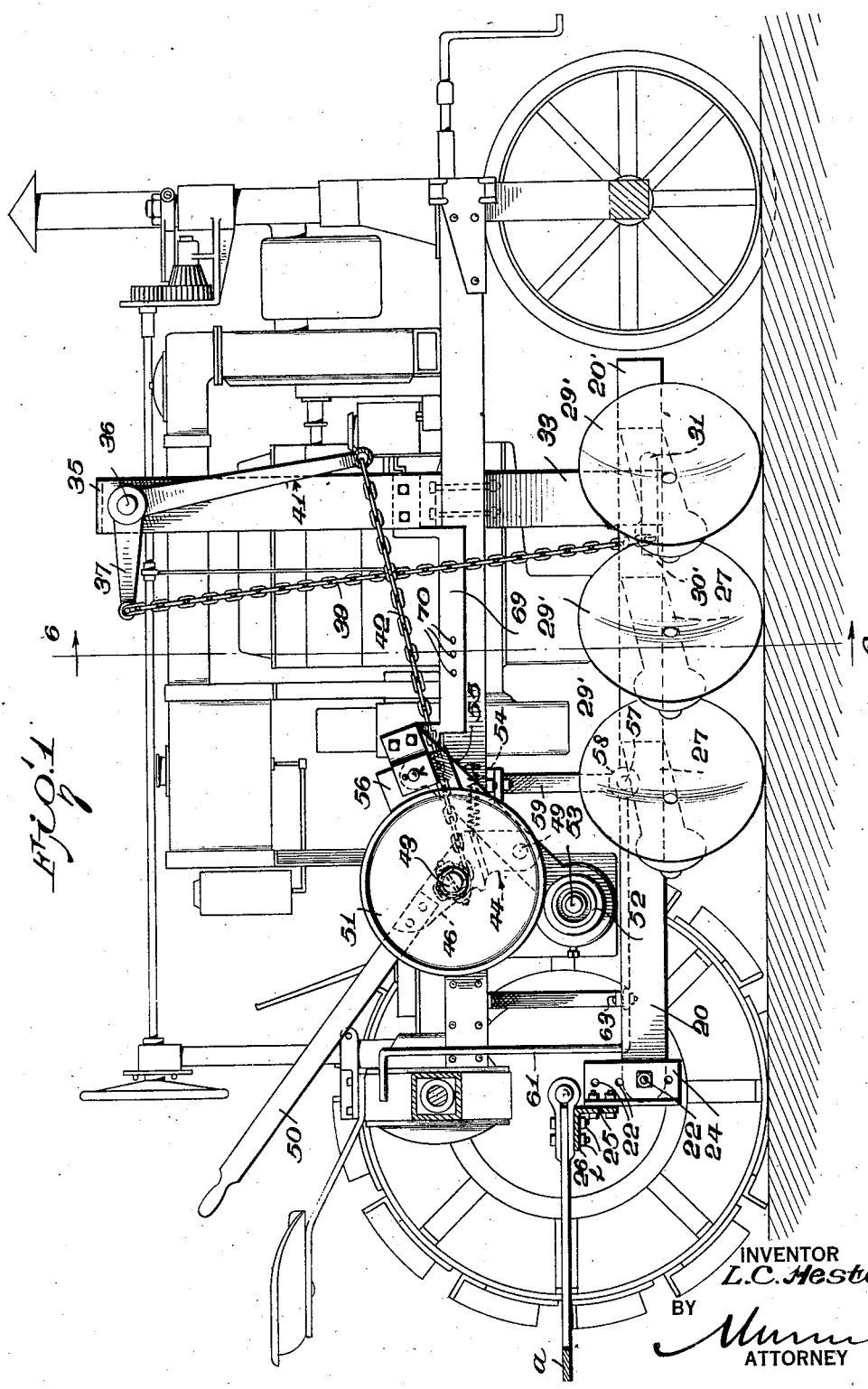
INVENTOR
L.C. Hester
BY
ATTORNEY

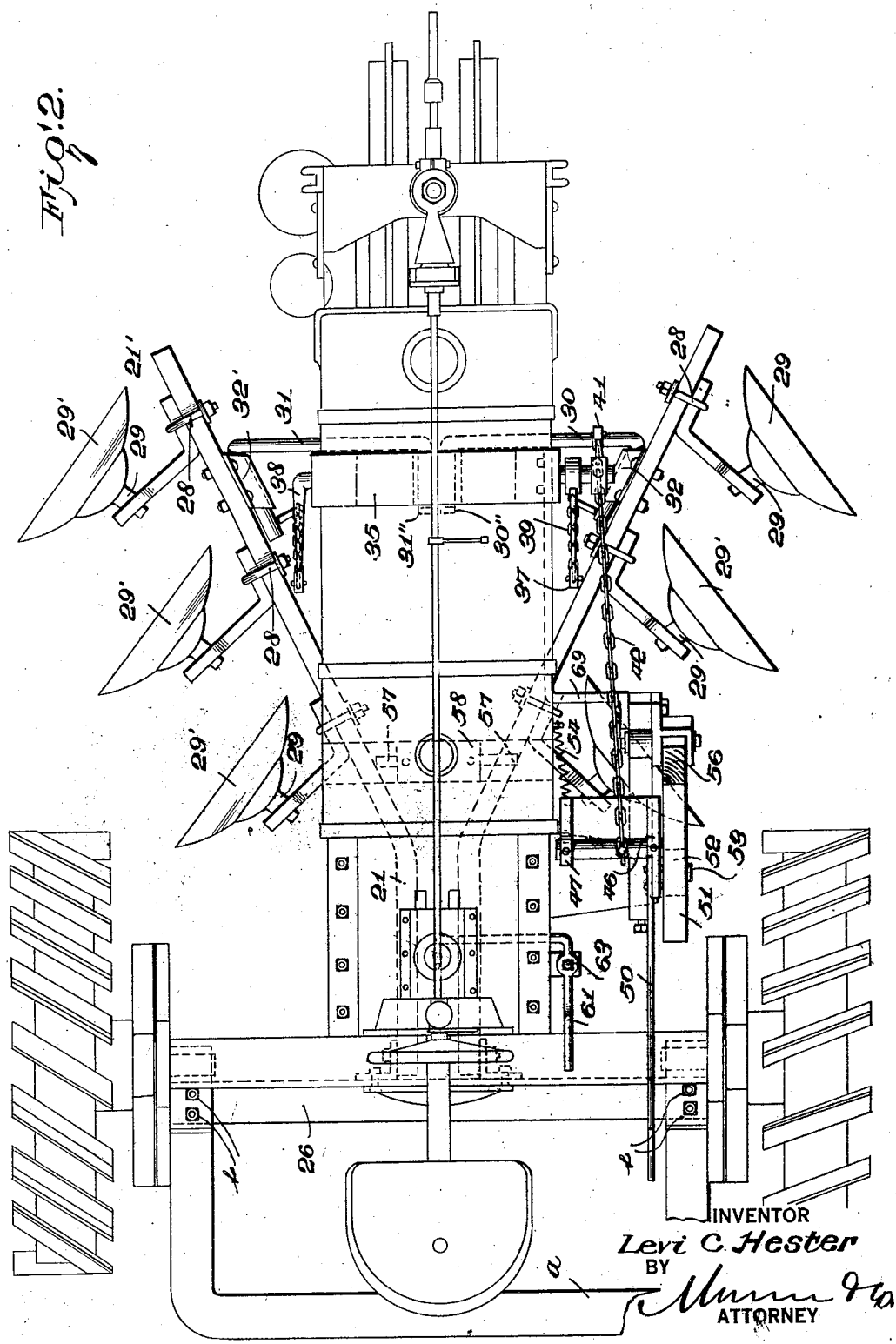

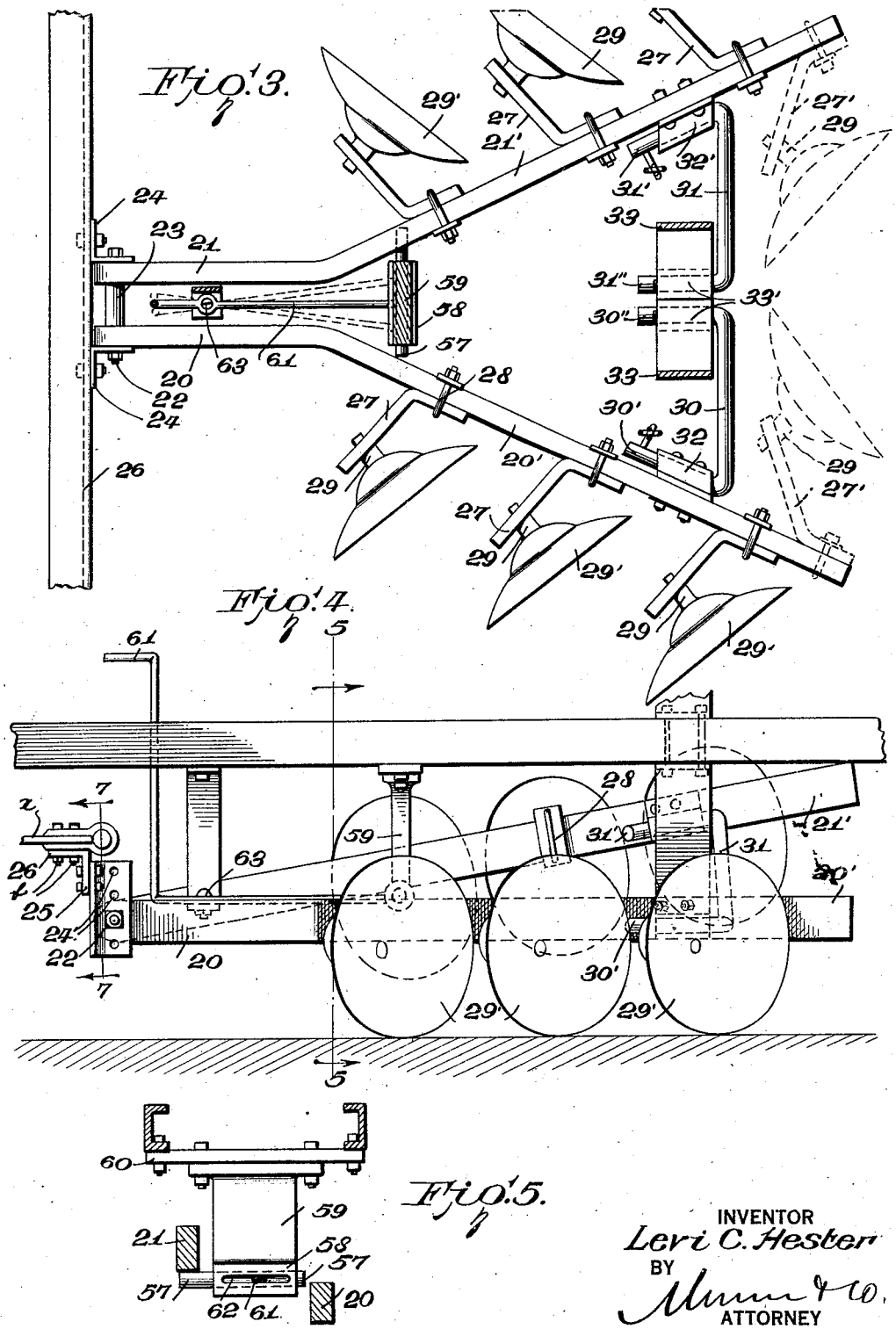

Aug. 26, 1930.     L. C. HESTER     1,774,008
AGRICULTURAL MACHINE
Filed Nov. 3, 1927     5 Sheets-Sheet 4
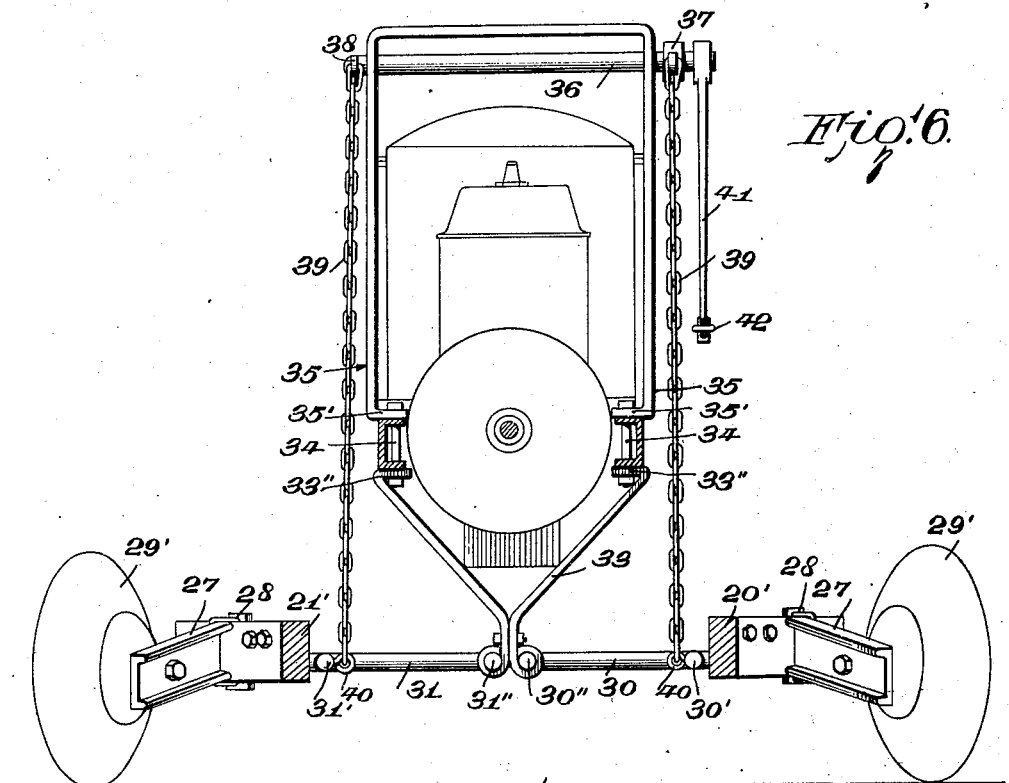
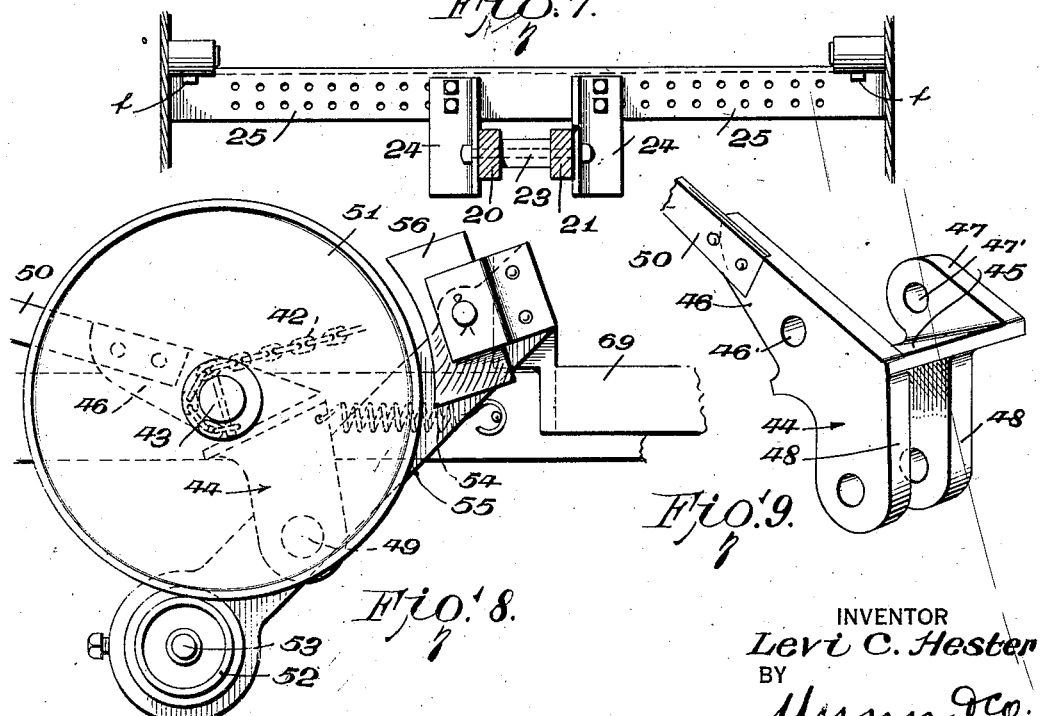
INVENTOR
Levi C. Hester
BY
Munn &Co.
ATTORNEY

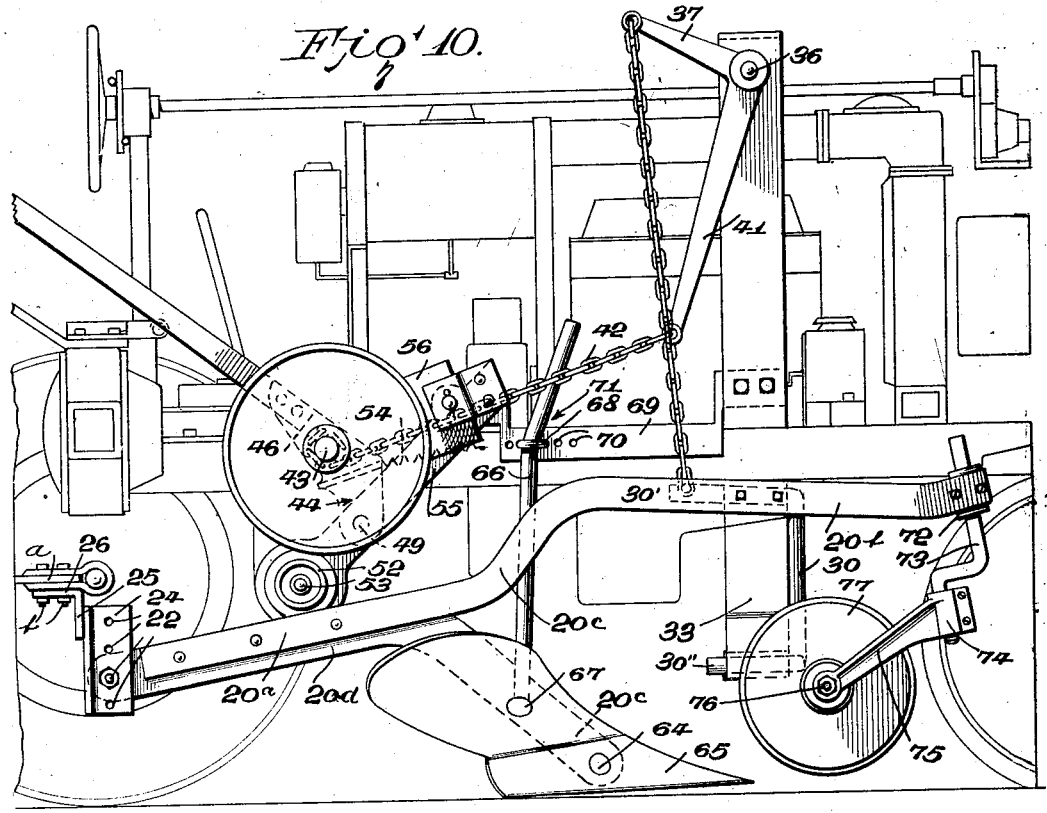
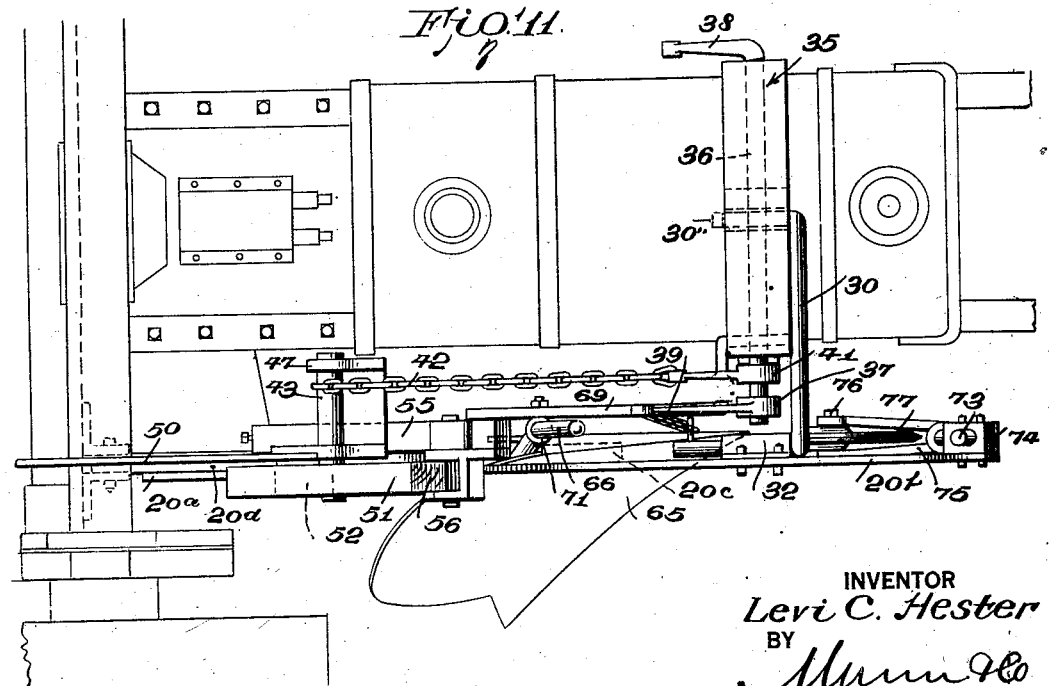

Patented Aug. 26, 1930

1,774,008

UNITED STATES PATENT OFFICE

LEVI C. HESTER, OF JACKSONVILLE, FLORIDA

AGRICULTURAL MACHINE

Application filed November 3, 1927. Serial No. 230,844.

This invention relates to improvements in agricultural machines generally, and more particularly to tractor driven types of such machines.

The principal object of the invention is to provide for a machine of the class set forth, and one of a comparatively simple but durable and efficient construction and arrangement of parts, and which is especially designed for either right or left hand plowing operations, such as will make it extremely valuable for use in orchards or other kindred soil conditioning operations, as well as for soil bedding and terracing operations.

Another object of the invention is to provide for a plow structure of a nature to be readily and easily attached to tractors of various makes, and generally the point of attachment or connection is effected directly at the rear ends only of the plow and tractor, so that the full power of the latter and its live weight is applied to the rear end or ends only of the beam or beams of the plow.

A further object of the invention is to provide for a plow attachment for tractors as hereinbefore mentioned, and one wherein the plow beam or beams is full floating forwardly of its point of attachment or connection with the tractor and are so arranged and supported in position that practically all side draft effects on the same and the plow blades carried thereby are eliminated.

A still further object of the invention is to provide for a plow attachment of the character mentioned, and one wherein both discs and mould-board types of plow blades are to be interchangeably employed with the same, and the mountings for the blades are arranged to permit changing of the positions of operations of the blades, so that they may be used for ordinary soil conditioning purpose from either the right or left hand side of the tractor or for shaping the plowed and conditioned soil into beds or terraces.

Another object of the invention is to provide for a plow of the type set forth, and one of a nature adapting the same for operative installation directly beneath those types of tractors which have a sufficient clearance beneath the same for the purpose, so that the point of attachment or connection of the tractor will effect an equalization of draft of the latter to the beam or beams of the plow.

A further object of the invention is to provide for a plow attachment of the type as hereinbefore characterized, and one embodying a simple but efficient means for lifting and lowering the plow from and to its soil conditioning position of operation, as well as to vary or otherwise regulate working depth or penetration of the plow blades when in lowered position, which means is preferably operable by the power of the tractor through a suitable mechanism under the control of the operator of the tractor.

With the foregoing and equally important objects in view, the invention resides in the certain new and useful combination, construction and arrangement of parts as will be hereinafter more fully described, set forth in the appended claims, and illustrated in the accompanying drawings in which:—

Figure 1 is a side elevation partly in section, of a conventional form of tractor, showing a practical application of the improved disc type of plow attachment and its lifter mechanism thereto, Figure 2 is an enlarged fragmentary top plan view thereof, Figure 3 is a top plan view of the plow attachment per se, with parts of its connection with the tractor shown in cross section, Figure 4 is a fragmentary side elevation of the plow attachment and its associated parts as it appears in Figure 3, Figure 5 is an enlarged transverse sectional detail taken on the line 5—5 of Figure 4, Figure 6 is a vertical transverse section taken on the line 6—6 of Figure 1, Figure 7 is a vertical transverse section taken on the line 7—7 of Figure 4, Figure 8 is an enlarged fragmentary side elevation of the power transmitting mechanism for operating the plow lifter and regulating means, Figure 9 is an enlarged perspective view of the bracket or mounting for the car driven bull wheel and the associated parts and the power transmitting mechanism, Figure 10 is a fragmentary side elevation of the tractor and the plow attachment, the latter being shown with a mould-board type of plow blade as applied thereto, and Figure 11 is a fragmentary top plan view of the tractor and plow as they appear in Figure 10.

Referring to the drawings wherein similar characters of reference designate corresponding parts throughout the several views thereof, A indicates generally a conventional form of farm tractor and "a" is the usual draw bar carried at the center of the rear end of the same.

The plow attachment in accordance with the present invention comprises a pair of beams preferably of bar iron and shaped to provide rearwardly directed short and substantially parallel end portions 20 and 21 and longer forwardly directed and divergent end portions 20' and 21'. The extreme rear ends of the parallel end portions 20 and 21 are apertured for pivotal connection on a pivot member or bolt 22, to either side of a spacing member or sleeve 23. The opposite ends of the pivot member 22 are supported in brackets 24 which are formed of suitable lengths of angle iron. These brackets 24 are bolted at their upper ends and in properly spaced relation to the forward side of the depending flange 25 of an auxiliary or supplemental draw bar 26. The projecting parallel flanged portions of the brackets 24 are provided with vertically spaced and complemental aligned apertures 24' for the adjustable arrangement therein of the pivot member 22. The supplemental draw bar 26 is also of angle iron and has its opposite ends secured to the complemental ends of the draw bar "a" of the tractor by means of the usual fastening bolts "b" employed in securing the latter draw bar in position on the tractor. The depending flange 25 of the supplemental draw bar 26, to which the brackets 24 are secured is preferably formed to provide horizontally spaced pairs of upper and lower apertures 25 for the engagement therewith to the bracket fasteners and whereby the brackets may be adjustably secured in position thereon as occasion may require.

In the disc type of plow as shown in Figures 1 to 9 angle brackets 27 are secured in spaced relation along the outer sides of the forwardly divergent end portions 20' and 21' of the plow beams, by means of fastenings 28. These fastenings 28 are preferably in the form of U bolts arranged to have their looped ends engaged over the angular attaching portions of the brackets 27, so that the latter may be adjusted as desired without requiring the removal of the bolts or the brackets from their engagement with the beams. For ordinary right and left hand plowing operations the brackets 27 are placed at the outer sides of the beams 20 and 21 as shown in full lines in Figures 1, 2, 3, 4 and 6, but for bedding or terracing the plowed soil the several brackets 27 will be removed and a substitute angular bracket 27' will be similarly secured at the inner side of each of the beams and at points adjacent the extreme forward ends thereof substantially as is shown in broken lines in Figure 3. In either case, the brackets 27 and 27' will be provided with forwardly directed spindles 29 on which are mounted disc plow blades 29'.

For changing or sustaining the plow beams 20 and 21 in any of their operative positions to allow for their independent or simultaneous vertical adjustments a pair of oppositely disposed members or arms 30 and 31 are provided and the outer ends of the same are bent into parallel relation with respect to the inner complementary sides of the beam portions 20' and 21' to form attaching portions 30' and 31' respectively, which attaching portions are hingedly engaged in members or bearings 32 and 32' moulded in position on the beam portions 20' and 21' for the purpose. Similarly the inner end portions 30" and 31" are angularly bent into parallel relation one with respect to the other to form attaching portions hingedly engaged in eyes or the like 33' formed at their lower ends with a pair of downwardly converging bracket arms 33 which, in turn have their upper ends angularly bent, as at 33", and apertured for secured engagement on fastenings or bolts 34 supported in the oppositely disposed side bars of the frame of the tractor.

Straddling the power plant of the tractor at a point intermediate its opposite ends is an inverted substantially U-shaped member or bracket 35 upon which is supported the lifter mechanism for the plow beams 20 and 21 which mechanism is to be hereinafter fully described. The lower end portions of the opposite legs of the member or bracket 35 are inturned, as at 35', and these inturned portions are apertured for secured engagement with the upper ends of the fastenings 34 as aforesaid. Journaled in the upper connected ends of the opposite legs of the member or bracket 35 is a transversely extending shaft 36 which has its opposite ends projecting beyond the outer faces of the bracket legs to receive thereon a pair of complementary arms 37 and 38, to the outer ends of which are attached the upper ends of a pair of flexible suspension members, such as chains 39. The lower ends of such chains 39 are connected indirectly to the plow beams 20 and 21, whereby to operate to lift and lower the beams accordingly with reversed directional movements of the arms 37 and 38 and the shaft 36. These arms 37 and 38 are aligned on the shaft 36 so that the operative movement of the same and the chain 39 will be uniform. As shown, the lower ends of the chain 39 are attached to eye bolts or the like 40 carried by the free end portions of the angularly disposed outer ends 30' and 31' of the hinged members 30 and 31. Secured to the end of the shaft 36, outwardly of the arm 37 thereon is another and longer arm 41, by means of which motion is imparted to the shaft for the actuation of the arms 37 and 38 and consequently to the chains 39 for effecting the desired raising and lowering of the plow beams 20 and 21.

The lifter mechanism thus provided is to be operated by power taken from the power plant of the tractor, and to this end a flexible member or chain 42 is attached at one end to the free end of the longer arm 41 on the shaft 36 and has its other end attached to a winding shaft 43 which is journaled in bearing brackets 44. As shown in Figure 9, this bearing bracket 44 is preferably in the form of a casting shaped to provide a transverse portion 45 at the upper side of which is provided an angularly extending arm 46 disposed in spaced parallel relation to an ear or lug 47. The arm 46 and the ear or lug 47 are apertured as at 46' and 47' respectively, to journal in the same the winding shaft 43 aforesaid. Projecting from the under side of the transverse portion 45 are a pair of spaced ears or lugs 48 which are complementally apertured for engagement on a pivot member or support 49. A hand lever 50 is attached to the arm 45 of the pivoted bracket 44 and extends therefrom to a point convenient to the position of the operator of the tractor. One end of the winding shaft 43 projects outwardly of the arm 46, of the bracket 44, and has keyed thereon a bull wheel 51, which, when the bracket 44 is swung backwardly on its pivotal support 49 by a downward pressure on the hand lever 50, is arranged to have its periphery frictionally engaged with the periphery of a power take-off disc or wheel 52 keyed on a shaft 53 which is driven from the power plant in the tractor in a usual manner. The bull wheel 51 is, however, normally sustained out of engagement with the take-off 52 by means of a tension device 54, which is preferably in the form of a coiled spring as shown in Figure 8. This spring 54 has one end connected to the bracket 44 at a point above the pivotal support 49 thereof, and its upper end to the adjacent side bar of the frame of the tractor. When normally positioned the spring 54 tensions the bracket 44 in a forward direction on the pivotal support 49 in a manner that the bull wheel 51 is held free from engagement with the take-off 52. Secured to the tractor at one side of the bull wheel 51 is a member or arm 55 which supports a brake shoe 56 in position to be engaged by the periphery of the bull wheel 51 when the latter is sustained by the spring 54 out of operative engagement with the power take-off 52.

When it is desired to alternate the plowing operations from one side or the other of the tractor, the plow beam at the side thereof opposite to the beam in use is to be sustained in lifted position, and for this purpose a supporting member or bolt 57 is slidably mounted in a member or sleeve 58, which is carried at the lower end of a bracket 59 depending from a cross bar 60 extending transversely between the opposite side bars of the tractor frame as is clearly illustrated in Figure 5. This member or bolt 57 is arranged to have one or the other of its opposite ends projected outwardly of the ends of the member or sleeve 58 and beneath an elevated plow beam. For manipulating the slide bolt or member 57 an actuating lever 61 is extended from a point adjacent the operator's position on the tractor and connects the member 57 at its center, a slot 62 being formed longitudinally of the member or sleeve 58 to permit of this arrangement and to allow for desired movements of the hand lever for the proper actuation of the member or bolt. As shown the lever 61 is fulcrumed at an intermediate point as at 63 to a fixed part of the tractor to facilitate its operation. By centering the sliding member or bolt 57 in the supporting sleeve 58 when both of the plow beams 20 and 21 are in raised position, the latter may be simultaneously supported in such position on the opposite ends of the member or bolt 57 as will be obvious.

Referring now to the slightly modified form of the invention as shown in Figures 10 and 11, it will be seen that two of the plow beams 20ª should be employed and are necessarily of a different shape from that of the beams 20 and 21, whereby to adapt the same for the attachment thereto of the mould-board type of blades. In this instance, each beam 20ª constitutes a rearwardly directed straight end portion which is angularly connected to a forwardly directed and substantially straight end portion 20ᵇ by an intermediate curved portion 20ᶜ. The extreme rear end of the rearwardly directed portion of the beam 20ª is pivotally engaged to the pivot pin or bolt 20 of the brackets 24 in the usual manner, except that a pair of these brackets 24 are employed to secure each of the oppositely disposed plow beams 20ª to the angular draw bar 25, and that the points of connection of the same to the latter are toward the outer opposite ends thereof as is distinguished from the central point of connection of the said brackets 24 with the auxiliary draw bar 25, as in the first instance of the invention. The angular disposition of the rearward and forward directed portions of the plow beams 20ª disposes the latter portion at a greater height from the ground surface to provide sufficient clearance for the proper operative movement of the plow blade.

To effect an efficient attachment of the mould-board plow blade to the plow beam 20ᵃ a carrier beam 20ᵈ is provided and the same provides a rearwardly directed straight end portion which is bolted or otherwise secured to the rearwardly directed straight end portion of the plow beam 20ᵃ and a forwardly and downwardly directed end portion 20ᵉ which carries at its free end a pivot 64 disposed in engagement with the lower portion of the plow blade 65. The forward end of this carrier beam 20ᵇ terminates in a plane below and slightly forward of the upwardly curved intermediate portion 20ᶜ of the main plow beam 20ᵃ so that the plow blade 65 is supported at the point of greater clearance below the latter and substantially in the plane of the transverse center of the tractor. From this arrangement, it will be seen that the plow blades 65, at the opposite sides of the tractor are operatively disposed at points substantially mid-way between the adjacent and front and rear ground wheels of the tractor.

To maintain the plow blade 65 in proper flat or horizontal working position and to automatically return the same to such position from tilted positions for penetration into or withdrawal from the soil, as the case may be, a vertically disposed controlled member 66 is provided and the same is preferably in the form of a bar or rod having its lower end pivotally connected as at 67 to the inner side of the plow blade 65 at a point substantially central of the latter and above and rearwardly of the point of pivotal connection 64 between the blade 65 and the carrier beam 20ᵈ. The upper end of this controlled member 65 is passed upwardly through an eye bolt or the like 68 which is adjustably secured in a supporting bar 69 bolted in horizontal position to and rearwardly of the bracket 35. This supporting bar 69 is formed to provide for a plurality of horizontally spaced apertures 70 for the adjustment of the eye bolt 68 as aforesaid. The upper end portion of the controlling bar 66, at and above its point of engagement with the eye bolt 68 is angularly bent as at 71 whereby to co-operate with the eye bolt in returning the plow blade 65 to its normal horizontal working position after each lowering operation of the lifter mechanism. As shown, the plow beams 20ᵃ are indirectly connected to the lifting elements or chains 39 after the manner of the plow beams 20 and 21 as in the first instance of the invention.

To stabilize and otherwise support the forward ends of the plow beam 20ᵃ the forward ends of the same are each provided with an angularly disposed bearing member 72 in which is journaled a spindle 73 rising from an enlarged end portion 74 of an angularly disposed arm 75. This arm 75 is pivotally directed rearwardly from the spindle 73 and has journaled in its free end the stub shaft or spindle 76 of a ground wheel 77.

In the operation of either form of the plow attachment as thus constructed, arranged and attached to a tractor, and for moving the plow and tractor from one point of use to another, both of the plow beams, will be supported in raised position on the sliding member or bolt 57, as hereinbefore explained. Now should it be desired to start a plowing operation, and to condition the soil at the right hand side of the tractor, the operator will shift the sliding member or bolt 57 further to the left hand side, which will allow the right hand plow beam to be lowered, so that the disc blades 29 on the one hand, or the mould-board type of plow blade 65 on the other hand, to penetrate the soil to be plowed. To effect the lowering of the plow beams to be used, either when using them simultaneously or separately, a slight downward pressure of the hand lever 50 will ease up on the brake shoe 55 in a manner to permit of the free rotation of the bull wheel 51, and consequently an unwinding of the flexible element or chain 41 from the winding shaft 42 by the gravitation of the plow beams when the mechanism is so released. Similarly, when it is desired to plow from the left hand side of the tractor, the left hand plow beam may be lowered in the same manner by the operator shifting hand lever 61 and the sliding member or bolt 57 to the right for the purpose. From the foregoing it will be readily obvious that, a piece of ground may be properly plowed, with the soil thrown either to the right hand or left hand side of the tractor, in one continuous movement of the tractor from one side of the piece of land to the other, and by making the turning points of the tractor to coincide with the direction of throw of soil from the plow blade.

As has been hereinbefore suggested bedding and terracing operations may be performed by these plow attachments, and more particularly with the disc type of such attachment, by removing from the outer opposite sides of the pairs of plow beams the gangs of plow blades and their mountings, and then substituting for the same a single plow blade and mounting at the inner side of each of the forwardly directed end portions of the beams after the manner as is shown in broken lines in Figure 3. By this angular disposition of the two plow blades the same will dispose the plowed soil toward each other in a manner to bed or terrace the soil between the same, and in line with the longitudinal center of the tractor in its forward direction of travel.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

What is claimed is:—

1. In combination, a tractor including a main draw bar at the rear end thereof, an auxiliary draw bar carried at its center by the main draw bar, and plow attachment disposed beneath the tractor and operatively and adjustably connected at their rear ends to the opposites of the said auxiliary draw bar.

2. In combination, a tractor including a main draw bar at the rear end thereof, an auxiliary draw bar carried at its center by the main draw bar, and oppositely disposed and forwardly directed plow beams adapted to be disposed beneath the tractor and operatively and adjustably connected at their rear ends to the opposite sides of said auxiliary draw bar.

3. In combination, a tractor including a main draw bar at the rear end thereof, a transversely extending auxiliary draw bar carried at its center by said main draw bar, oppositely disposed and forwardly directed plow beams adapted to be disposed beneath the tractor, pivot means connecting the rear ends of said plow beams to the opposite ends of said auxiliary draw bar and a plurality of plow blades carried by each of said plow beams.

4. In combination, a tractor including a main draw bar at the rear end thereof, a transversely extending auxiliary draw bar carried by said main draw bar, oppositely disposed and fowardly directed plow beams disposed beneath the tractor, adjustable pivot means connecting the rear ends of said plow beams to said auxiliary draw bar, a plurality of plow blades carried by each of said plow beams, and means for controlling the forward portions of said plow beams to restrain the same from lateral and vertical movements.

5. In combination, a tractor including a main draw bar at the rear end thereof, a transversely extending auxiliary draw bar carried by said main draw bar, oppositely disposed and forwardly directed plow beams disposed beneath the tractor, vertically adjustable pivot means connecting the rear ends of said plow beams to said auxiliary draw bar, plow blades carried by said plow beams, and means for controlling the forward portions of said plow beams to restrain the same from lateral and vertical movements.

6. In combination, a tractor including a main draw bar at the rear end thereof, a transversely extending auxiliary draw bar carried by said main draw bar, oppositely disposed and forwardly directed plow beams disposed beneath the tractor, vertically adjustable pivot means connecting the rear ends of said plow beams to said auxiliary draw bar, plow blades carried by said plow beams, and means for controlling the forward end portions of said plow beams to restrain the same from lateral and vertical movements.

7. In combination, a tractor including a main draw bar at the rear end thereof, a transversely extending auxiliary draw bar carried by the main draw bar and commonly connected therewith to the tractor, oppositely disposed plow beams disposed beneath the tractor, pivot means connecting the rear ends of said plow beams to said auxiliary draw bar, means for adjusting said pivot means vertically of said auxiliary draw bar, a plurality of plow blades carried by said plow beams, and means for controlling the forward ends of said plow beams to restrain the same from lateral and vertical movements.

8. In combination, a tractor including a main draw bar at the rear end thereof, a transversely extending auxiliary draw bar carried by the main draw bar, and commonly connected therewith to the tractor, oppositely disposed plow beams adapted to be disposed beneath the tractor, pivot means connecting the rear ends of said plow beams and said auxiliary draw bar, means for adjusting said pivot means vertically and longitudinally of said auxiliary draw bar, and a plow blade carried by each of said plow beams.

9. In combination, a tractor including a main draw bar at the rear end thereof, an auxiliary draw bar carried by the main draw bar, oppositely disposed plow beams disposed beneath the tractor, and pivotally connected to said auxiliary draw bar at their rear ends for vertical movement relative thereto, interchangeable mountings carried by said plow beams, a plow blade carried by each of said mountings, and means for restraining said plow beams against lateral and vertical displacement.

10. In combination, a tractor including a main draw bar at the rear end thereof, an auxiliary draw bar carried by the main draw bar, oppositely disposed plow beams disposed beneath the tractor and pivotally connected to said auxiliary draw bar at their rear ends for vertical movements relative thereto, plow blade mountings carried by said plow beams, plow blades pivotally supported on said mountings, means co-operable with said plow blades for adjusting the same to normal soil conditioning position when the plow blades have penetrated the soil at a predetermined depth, and means for controlling the forward end portions of said plow beams to restrain the same from lateral and vertical displacement.

11. In combination, a tractor including a main draw bar at the center of the rear end thereof, an auxiliary draw bar supported transversely of said main draw bar, and a pair of oppositely disposed soil conditioning units disposed beneath the body of said tractor and having their rear ends adjustably pivoted to said auxiliary cross bar, one adjacent each side of said main draw bar, said units extending forwardly and obliquely from their points of connection with said auxiliary draw bar.

12. In combination, a tractor including a main draw bar at the center of the rear end thereof, an auxiliary draw bar supported transversely of said main draw bar, a pair of oppositely arranged soil conditioning units disposed beneath the body of said tractor and having their rear ends pivotally connected to said auxiliary draw bar, said units extending forwardly and obliquely outward from their points of connection with said auxiliary draw bar, means pivotally connecting said units at points intermediate their respective lengths to an adjacent portion of the tractor body, means for raising and lowering the forward end portions of either or both of said units from and to soil conditioning position, and means for securing either or both of said units in raised position.

13. In combination, a tractor including a main draw bar at the center of the rear end thereof, an auxiliary draw bar supported transversely of said main draw bar, a pair of oppositely arranged soil conditioning units disposed beneath the body of said tractor and having their rear ends pivotally connected to said auxiliarly draw bar, one adjacent to each side of said main draw bar, said units extending forwardly and obliquely outward from their points of connection with said auxiliary draw bar, means pivotally connecting said units to an adjacent portion of the tractor body at similar points toward their forward ends, means for raising and lowering the forward end portions of either or both of said units from and to soil conditioning position, and means for securing one or both of said units in raised position.

14. In combination, a tractor including a main draw bar at the center of the rear end thereof, an auxiliary draw bar supported transversely of said main draw bar, a pair of oppositely arranged beams disposed beneath the body of said tractor and having their rear ends pivotally connected to said auxiliary draw bar one adjacent to each side of said main draw bar, said beams extending forwardly and obliquely outward from their points of connection with said auxiliary draw bar, means pivotally connecting said beams to an adjacent portion of the tractor body toward their forward ends, soil conditioning units carried by said beams, means for raising and lowering the forward end portions of either or both of said beams from and to the soil conditioning position of the elements thereon, and means for securing either or both of said beams in raised position.

15. In combination, a tractor including a main draw bar at the center of the rear end thereof, an auxiliary draw bar supported transversely of said main draw bar, a pair of oppositely arranged beams disposed beneath the body of said tractor and having their rear ends pivotally connected to said auxiliary draw bar, one adjacent to each side of said main draw bar, said beams extending forwardly and obliquely from their points of connection with said auxiliary draw bar, means pivotally connecting said beams to an adjacent portion of the tractor body toward their forward ends, soil conditioning elements carried at the outer sides of said beams, other soil conditioning elements carried at the inner sides of said beams toward the forward ends thereof, means for raising and lowering the forward ends of either or both of said beams from and to the soil conditioning position of the elements thereon, and means for securing either or both of said beams in raised position.

16. In combination, a tractor including a main draw bar at the center of the rear end thereof, an auxiliary draw bar supported transversely of said main draw bar, a pair of oppositely arranged beams disposed beneath the body of said tractor and having their rear ends pivotally connected to said auxiliary draw bar, one adjacent to each side of said main draw bar, said beams extending forwardly and obliquely from their points of connection with said auxiliary draw bar, means pivotally connecting said beams to an adjacent portion of the tractor body toward their forward ends, soil conditioning elements carried at the outer sides of said beams, other soil conditioning elements carried at the inner sides of said beams toward the forward ends thereof, means for raising and lowering the forward ends of either or both of said beams from and to the soil conditioning position of the elements thereon, and sliding bolt means common to both of said beams for securing either or both of them in raised position.

17. In combination, a tractor including a main draw bar at the center of the rear end thereof, an auxiliary draw bar supported transversely of said main draw bar, a pair of oppositely disposed beams arranged beneath the body of said tractor and having their rear ends pivotally connected to said auxiliary draw bar, one adjacent to each side of said main draw bar, said beams extending forwardly and obliquely outward from their points of connection with said auxiliary draw bar, means pivotally connecting said beams to an adjacent portion of the tractor body toward their forward ends, soil conditioning elements carried at the outer sides of said beams, other soil conditioning elements carried at the inner sides of said beams toward the forward ends thereof, means for utilizing the power of the tractor for raising and lowering the forward ends of either or both of said beams from and to the soil conditioning position of the elements thereon, and means for securing either or both of said beams in raised position.

Signed at Jacksonville, in the county of Duval and State of Florida this 1st day of November, A. D. 1927.

LEVI C. HESTER.